Aug. 6, 1935.    W. C. SULLENDER    2,010,741
DIRECTION INDICATOR FOR VEHICLES
Filed Feb. 19, 1934    5 Sheets-Sheet 4
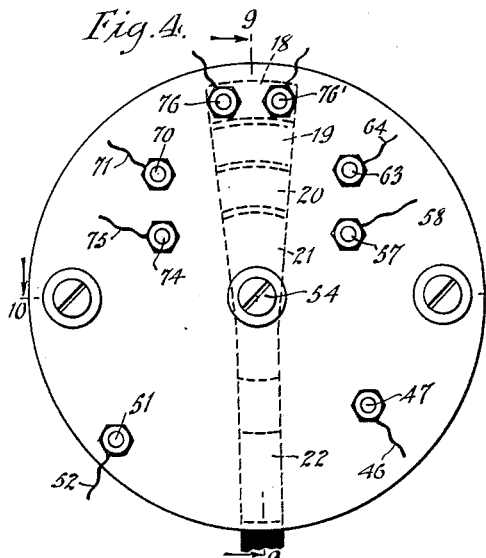
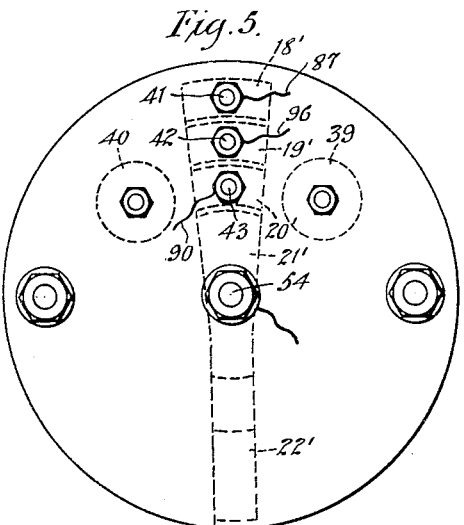
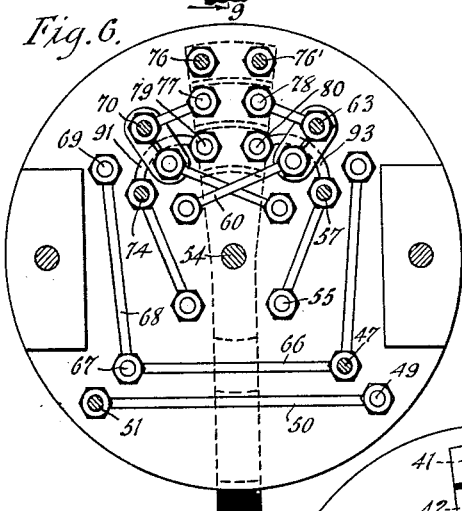
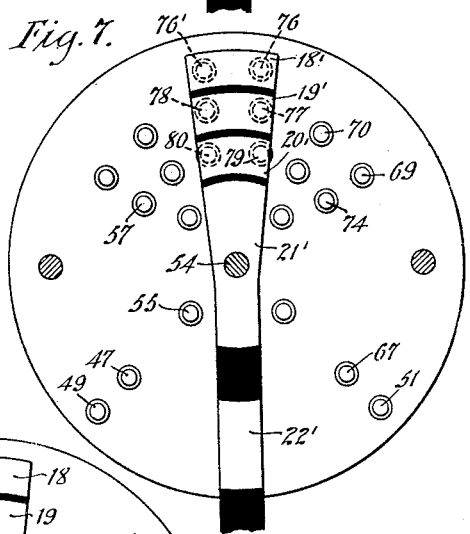
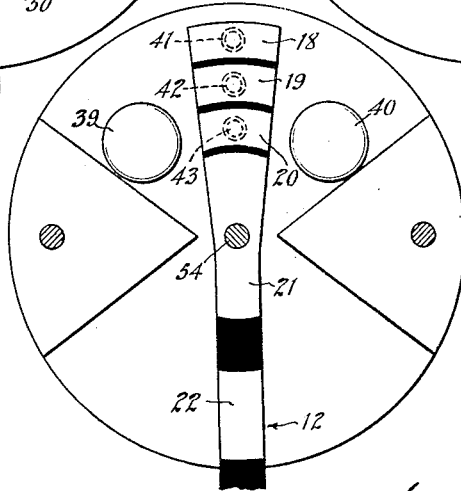
INVENTOR
Walter C. Sullender
ATTORNEYS Aug. 6, 1935.    W. C. SULLENDER    2,010,741
DIRECTION INDICATOR FOR VEHICLES
Filed Feb. 19, 1934    5 Sheets-Sheet 5
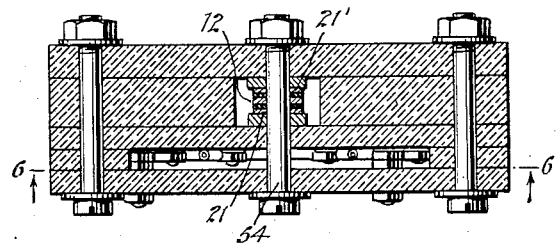
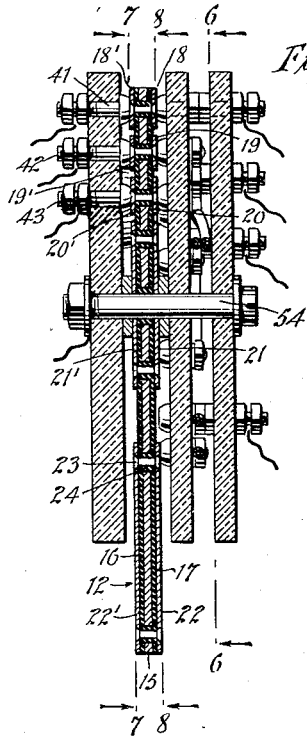
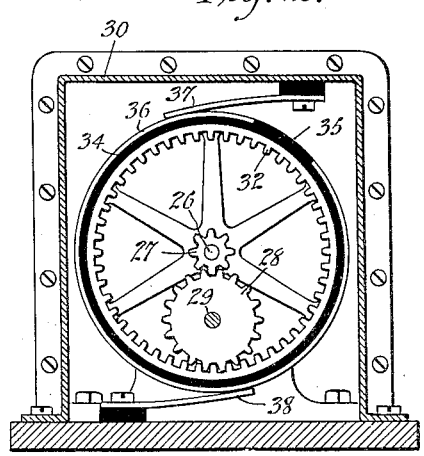
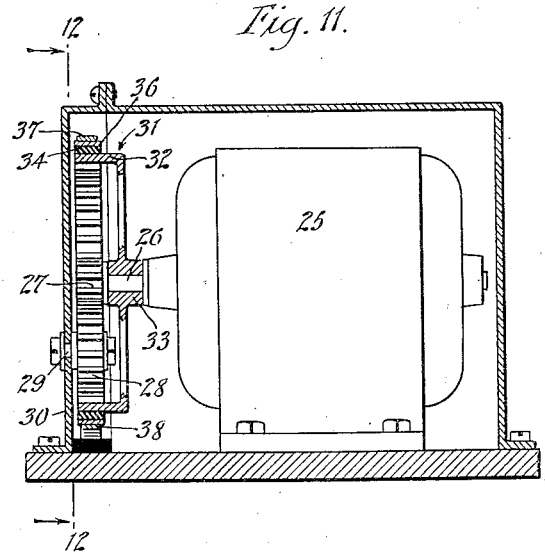
WITNESSES
Edw. Thorpe
A. L. Kitchin
INVENTOR
Walter C. Sullender
BY
Munn, Anderson, Stanley, Foster & Liddy
ATTORNEY Patented Aug. 6, 1935

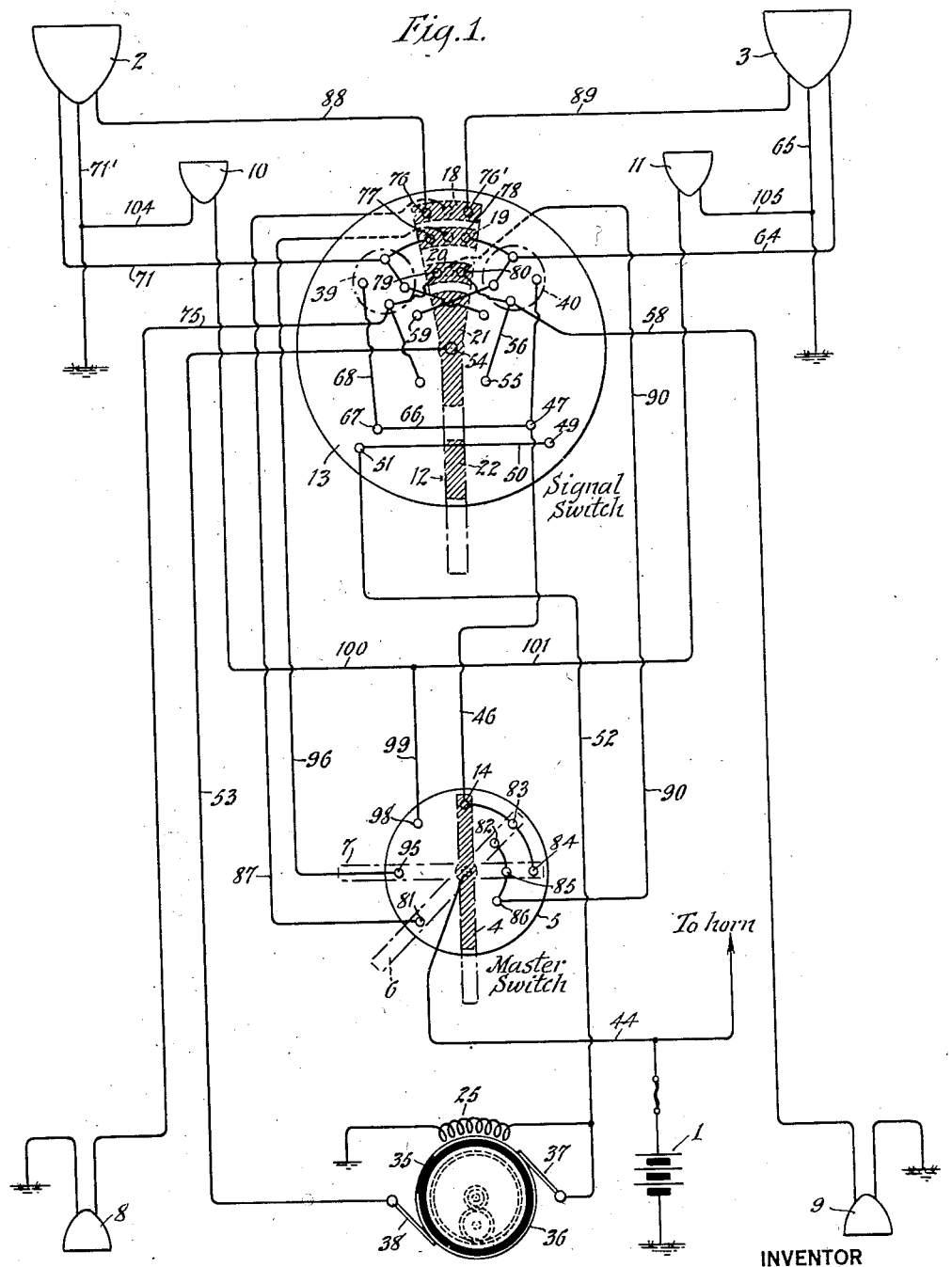

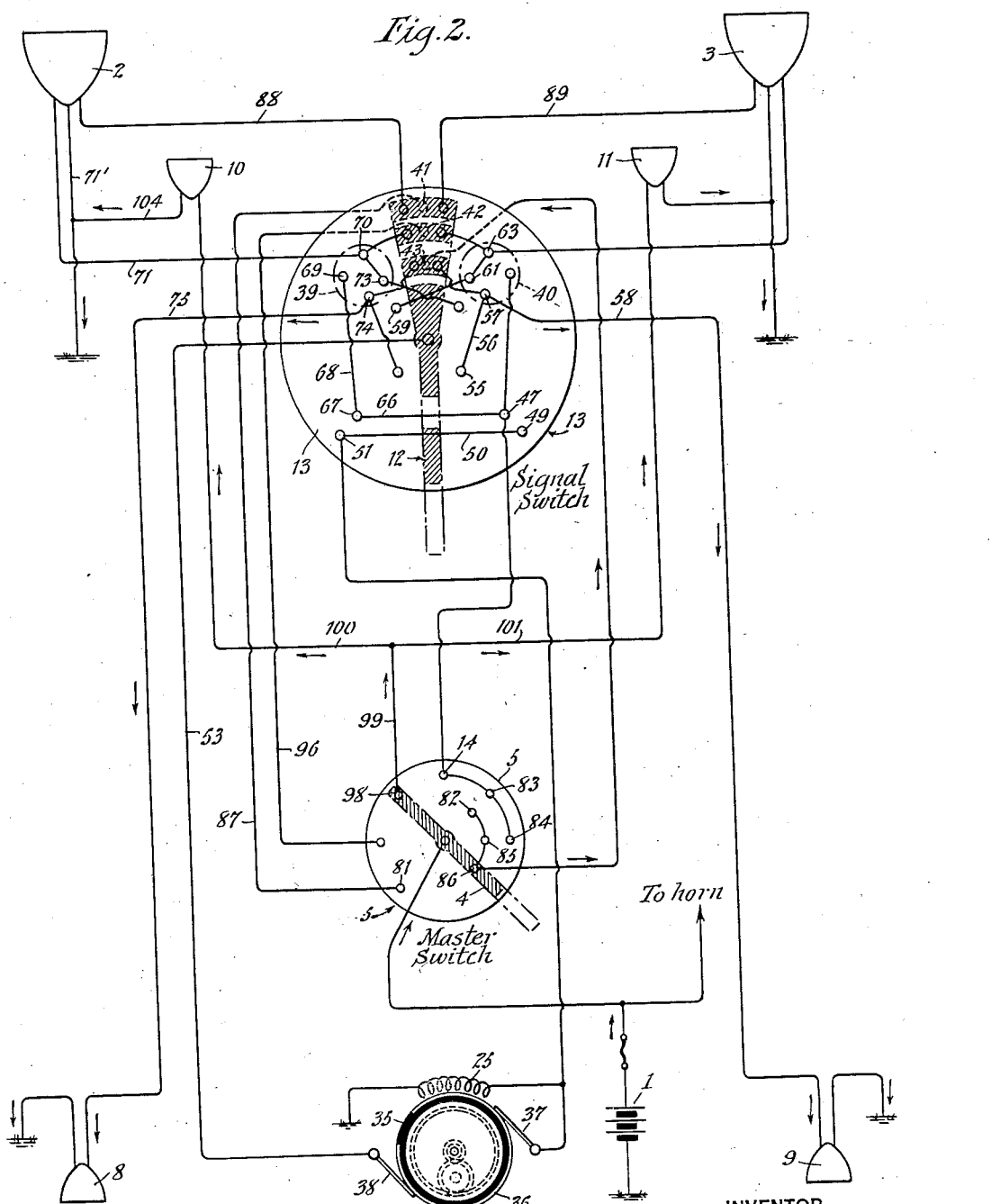

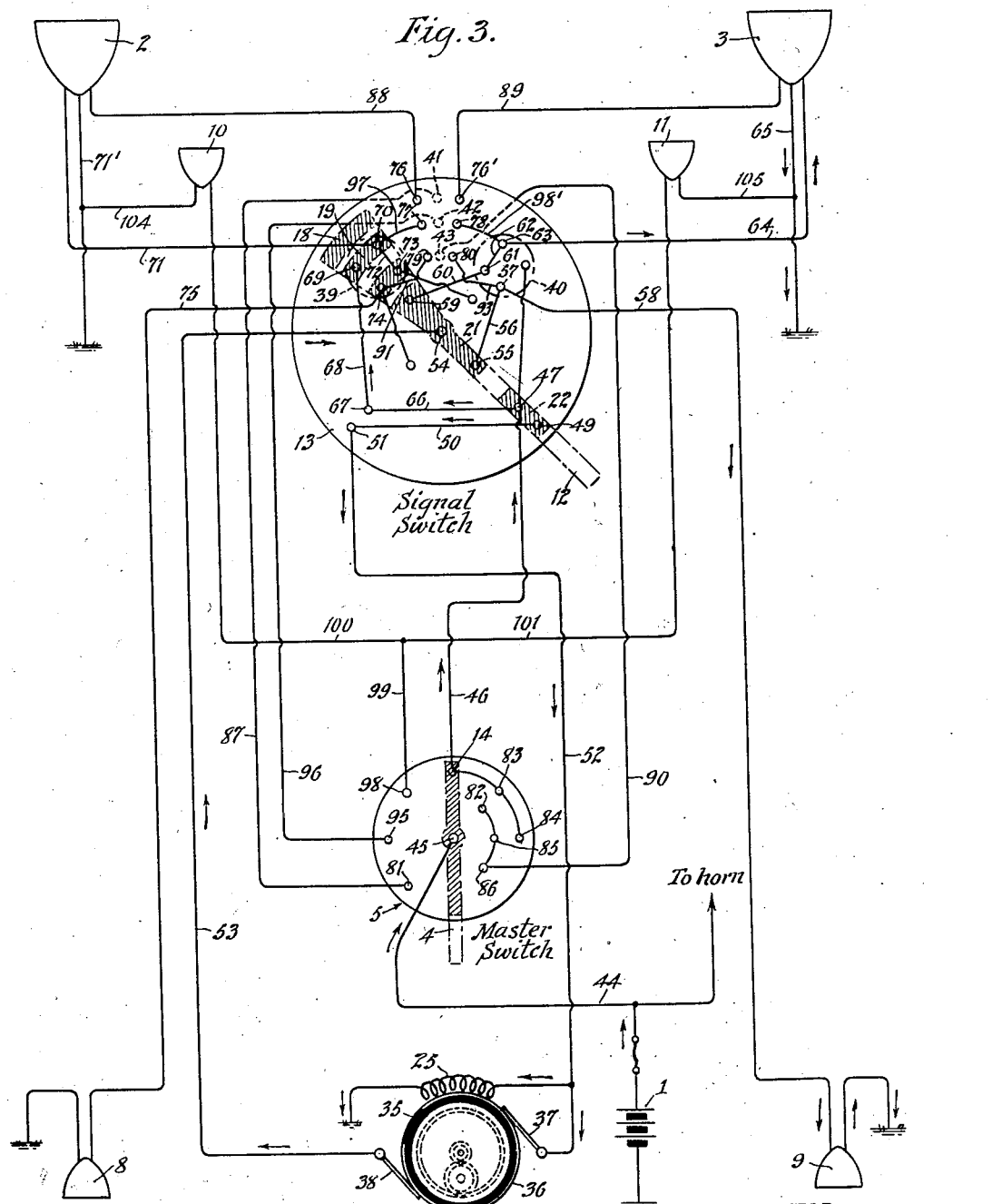

2,010,741

UNITED STATES PATENT OFFICE 2,010,741

DIRECTION INDICATOR FOR VEHICLES

Walter C. Sullender, St. Louis, Mo.

Application February 19, 1934, Serial No. 712,053

3 Claims. (Cl. 177—337)

This invention relates to signal devices for automobiles, and particularly to a direction indicator for vehicles whereby the driver of an automobile may signal to persons in front or rear indicating the direction in which he intends to turn.

The object of the present invention is to provide an improved signaling structure for automobiles wherein the driver of an automobile may set the signaling device in operation at any time and thereby indicate to persons in front or rear which direction he is going to turn without extending his hand from the automobile, and wherein he may maintain the signal operating for any desired length of time while keeping the automobile under perfect control.

Another object of the invention is to provide a signaling device which may be operated at front and rear and either side of the car for indicating the direction of turning, the structure being such that it may be set before the turning operation takes place and then left alone until it is reset, with the driver meanwhile using both his hands and feet freely to control the car as desired.

A further object, more specifically, is to provide a direction indicator for automobiles wherein the driver may cause the front and rear lights at either side to flicker or wink and, in addition, maintain the flickering or winking action as long as desired without affecting the front rear lights on the opposite side of the car.

In the accompanying drawings—

Figure 1 is a diagram showing the wiring and associated parts disclosing a complete embodiment of the invention, with the parts set in what may be termed a neutral position;

Figure 2 is a view similar to Figure 1 but showing the parts so set as to cause the parking and tail lights to operate in the usual manner of lights of this character;

Figure 3 is a view similar to Figures 1 and 2 but disclosing an adjustment whereby the dim light at the front and right hand side and the rear light on the right hand side are flickering, while the front and rear lights on the left hand side are projecting steady beams of light;

Figure 4 is a plan view on a slightly enlarged scale of the signal switch shown in Figure 1;

Figure 5 is a rear view of the switch shown in Figure 1;

Figure 6 is a sectional view through Figures 9 and 10 on the respective lines 6—6;

Figure 7 is a sectional view through Figure 9 on the line 7—7;

Figure 8 is a sectional view through Figure 9 on the line 8—8;

Figure 9 is a central sectional view through Figure 4 on the line 9—9;

Figure 10 is a sectional view through Figure 4 on the line 10—10;

Figure 11 is a view partly in section showing a motor and a make-and-break, disclosing certain features of the invention;

Figure 12 is a sectional view through Figure 11 on the line 12—12.

In the accompanying drawings a construction has been shown which is applicable to automobiles now in common use, which utilizes current from the usual battery now in common use. In most States of the United States laws are provided whereby the driver of a vehicle must in some manner signal to a following automobile showing the direction in which the leading automobile intends to turn when about to make the turn. It is quite prevalent in most States to hold out one arm to give the desired signal. This, however, necessitates releasing one arm from the wheel and thus handicaps the driver in the full control of the automobile at a time when he needs the use of both hands to make the desired turn. Heretofore various mechanical hands or pointers have been provided which may be swung to indicating position to indicate when the driver is about to turn and, in addition, various signaling arrows have been provided at the rear of automobiles purporting to give the same information. Many of these devices cannot be readily seen and many do not begin to function until part of the turn has been accomplished. To overcome these disadvantages and others and to provide a construction which will positively operate at the time desired by the driver, means have been provided in the present invention whereby the operator of an automobile may at some time previous to making a desired turn adjust the signaling device to set the same into operation so that a following automobile may know an appreciable time ahead the direction in which the leading automobile wishes to turn. In addition the device embodying the invention will signal to an approaching automobile that a turn is about to be made and will indicate by the same signal in which direction the driver wishes to turn.

In Figure 1 of the accompanying drawings a diagram has been presented which illustrates the invention applied to a conventional automobile provided with the usual head lights, the usual cowl lights and the usual tail lights, one at each side of the rear of the car. This automobile is provided with the usual battery 1, which is shown as being grounded on the car in the usual manner. When the parts are arranged as shown in Fig. 1 the device is really not functioning and all of the lights have been switched out.

When it is desired to use the low filaments of the head lights 2 and 3, the contact arm 4 of the master switch 5 is swung over to the dotted position 7. The switch arm 4 is a metallic conductor and acts to connect certain terminals in the master switch according to the way the arm is positioned. When it is desired to run with bright lights the arm 4 is moved over to the dotted position 6. When in either of these positions current is supplied to the respective rear or tail lights 8 and 9. It will thus be seen that the switch arm 4 of master switch 5 acts as the usual light switch when in the positions just described, so that the various lamps will function in the usual manner.

If the switch arm 4 is moved to the right as shown in Fig. 2 the head lights are turned out but the two parking or cowl lights 10 and 11 are lit and also the tail lights 8 and 9. During the movement of the arm 4 it is assumed that the arm 12 of signal switch 13 is stationary and in the position shown in Figures 1 and 2. So far the function of the respective switches, connecting wires and the like has been merely to cause the respective front and rear lights, and the respective cowl lights, to function in the usual manner as far as being lit and turned off is concerned. Ordinarily when driving along a road the bright lights of the head lights 2 and 3 are used and the two tail lights 8 and 9 are used. If it becomes necessary or desirable to turn to the right, the switch arm 12 of the signal switch 13 is turned to the position shown in Figure 3. When the two switch arms 4 and 12 are positioned as shown in Fig. 3, the lamps 2 and 8 are functioning in the usual manner to give a steady light, the lamp 2 using the dim light filaments. At the same time the dim light filaments in the head light 3 and the filaments in the tail light 9 are flickering or winking. The number of times these lamps flicker or wink may be varied, but for average use from six to eight times per second is considered desirable as it will quickly attract the attention of the driver of a following automobile and indicate to him that the leading automobile desires to make a right hand turn. The device is set to the position shown in Fig. 3 a short time before the turn is made and as soon as the switch arms are set as shown, the driver's hands and feet are entirely free to control and manipulate the car so that the turn may be made in perfect safety. It will, therefore, be seen that the flickering and winking of the lights on the right hand side starts before the turn is made, continues during the turning action, and only stops after the turn has been made and the driver has readjusted arm 12. If the tail lights and the bright head lights are to be used the driver merely swings arm 12 back to its central or neutral position as shown in Fig. 1.

In case it should be desired to turn to the left, arm 12 is moved to the left the same distance that it has been moved to the right as shown in Fig. 3, and the left hand lamps 2 and 8 will function as described with regard to lamps 3 and 9 when making the right hand turn. By reason of this construction the driver will not be compelled to extend his hand for signaling purposes, and he may also cause his signal to start and stop whenever he wishes so as to give other drivers ample time to learn his intentions.

The various circuits for accomplishing the results just described will be traced, but before this is done it is desired to point out that the switch arm 4 may be a solid piece of metal, while the switch arm 12 is constructed in a special manner as shown, for instance, in Fig. 9. As illustrated in this figure, the switch arm 12 is provided with a central metal plate 15 which extends from one end of the arm to the other. On both sides of this plate are arranged insulating plates 16 and 17, and on top of the insulating plates are arranged various metallic segments 18, 18', 19, 19', 20, 20', 21, 21', 22 and 22'. Preferably the insulating plates 16 and 17 are cut away between these various sections as illustrated in Fig. 9, and also as indicated in Figs. 1 to 3. The plates 18 and 18' are connected by one or more rivets 23, said rivet or rivets being insulated by an insulating sleeve 24 extending through a suitable aperture in plate 15. This same arrangement is carried out throughout the entire arm 12 so that opposite plates or sections are electrically connected as well as mechanically connected together in pairs and the pairs are insulated from each other.

In addition to the specific structure of the arm as set forth, it will be seen from Figs. 11 and 12 that there is provided an electric motor 25 which is a small motor, for instance, of the type used in blowing horns, said motor being connected to the battery 1 as shown in Fig. 1. This motor is provided with a shaft 26 to which a pinion 27 is rigidly secured, whereby this pinion rotates whenever the motor 25 functions. Pinion 27 continually meshes with the idler gear 28 supported by the shaft 29, carried by the frame 30, said frame enclosing the motor 25 and a make-and-break structure 31 of which the gearing just described forms a part. An internally geared ring 32 is provided with suitable spokes and a hub 33 loosely mounted on shaft 26, the gears of this geared ring continually meshing with the idler 28. By reason of the construction just described the motor 25 may operate at a comparatively high rate and yet the geared ring 32 may rotate rather slowly as, for instance, six or eight times per second. An insulating ring 34 is mounted on the periphery of ring 32 and connected thereto in any desired manner so as to rotate therewith. This ring is cut away except at section 35 so that a metal band 36 may be fitted into the ring 34 with the outer surface of the band 36 flush with the outer surface of section 35. Contact springs 37 and 38 continually bear against the structure just described, as shown in Fig. 12, and whenever either of the brushes are resting on section 35, the circuit through these brushes will be broken, but when both brushes are engaging the band 36 current will flow when motor 25 is operating. Member 36 has been described as a band for the purpose of description, but it will be understood that it is open at one point to accommodate section 35 so that this section completes the ring structure. The contact springs 37 and 38 are insulated from surrounding objects except the band 36 and are connected with suitable wires through which current passes to the respective dim head lights and tail lights when any of these lights are fluttering.

As shown in Fig. 8 the signal switch 13 is provided with a pair of metal blocks or plates 39 and 40 positioned so that the segments 19 and 20 will be brought into engagement therewith according to which direction the arm 12 has been swung. As illustrated in Fig. 8 there are provided contacts 41, 42 and 43 which are engaged by the sections or plates 18, 19 and 20 when the arm 12 is in its neutral position, as shown in Fig. 1. In Figs. 4 to 7, inclusive, will be seen the mechanical structures illustrated in diagram in Figs. 1 to 3, and it is therefore thought that upon tracing the circuits and describing the structure illustrated in Figs. 1 to 3, the features illustrated in the figures just mentioned will be clear.

As heretofore stated, when the parts are in the position shown in Fig. 1 all the lights have been turned off and, therefore, no parts are functioning. When the arm 4 is turned to the dotted position 6 as shown in Fig. 1, the tail lights 8 and 9 are turned on and also the bright lights of the head lights 2 and 3. By turning the switch arm 4 further to the dotted position 7 the tail lights will remain on and the dim lights of the head lights 2 and 3 will be in use. Up to this point the arm 4 and associated parts are functioning merely as the usual light switch now in common use, and also by swinging the arm 4 to the right as shown in Fig. 2 this arm and associated parts will act in the usual manner of the ordinary switch light now in common use for turning on the parking lights, which include the cowl lights and the tail lights. However, when it is desired to turn to the right, the operator moves arm 12 to the right, or to the position shown in Fig. 3. When the parts are in these respective positions current will flow from the battery 1, through wire 44, to the arm 4 at the pivotal point 45. This provides arm 4 with current, and as this arm is in engagement with contact 14 current will flow onto and through wire 46 to contact 47. Contact 47 is in electrical engagement at this time with sections or plates 22. As sections 22 and 22' are connected by a suitable rivet it will be understood that both sections are energized, but through plate 22 current passes from contact 47 to contact 49, through wire 50, contact 51, wire 52, the respective windings of motor 25, to the ground, whereby motor 25 begins to function.

At the same time current will pass from wire 52 to the brush or spring 37, through band 36 to brush 38, wire 53 to section or plate 21, through the pivotal support 54 which is of metal and which is continually in electrical engagement with plates 21 and 21'. Current energizes plate 21, passes through contacts 55, wire 56, contact 57, wire 58 to lamp 9, and thence to the ground. Current will also pass from section or plate 21 to contact 59, wire 60, contact 61, wire 62, contact 63, and wire 64 to the dim filaments in the head lights 3, and thence to the ground through wire 65. It will therefore be seen that current to lamp 9 and the dim filaments of lamp 3 will pass through the interrupter or make-and-break 31, and consequently will flicker each time the insulating section 35 (Fig. 2) passes beneath either of the brushes 37 or 38. This flickering action will continue as long as the arms 4 and 12 are left in the respective positions shown in Fig. 3. While current is passing the manner described and causing a flickering in the lamps 3 and 9, current will be flowing to lamps 2 and 8, whereby these lamps will give a steady illumination.

While the current is passing through lamps 3 and 9 and flickering, current is also passing from contact 47 through wire 66, contact 67, wire 68, contact 69, plate 19, contact 70, wire 71 to the dim filaments of lamp 2, and thence through wire 71' to the ground. Also current will pass from contact 70 through wire 72 to contact 73 to the plate or section 20, and through this plate to the contact 74, and thence through wire 75 to lamp 8.

When turning to the left, the arm 12 is swung over so that the contacts 51 and 67 will be connected, and the opposite contacts and wires to that just described. As the opposite side is a duplication, no additional description is thought necessary, as the description in regard to the right hand turn equally applies to a left hand turn.

It will be noted that when the lever 12 is swung to the position shown in Fig. 3, plate 39 will function. If swung to the opposite position, plate 40 will naturally function. These plates function to connect the plates or sections 19 and 20, whereby all of the contacts 69, 70, 73 and 74 will be electrically connected. It will be noted that current enters at point 69 and is carried to the left hand lights through points 70 and 74 and wire 71. It will also be noted that when arm 12 is in its central position as shown in Fig. 1, contacts 75, 76' and 41 are connected by section 18, contacts 77, 78 and 42 are connected by the section 19, while contacts 79, 80 and 43 are connected by section 20. In view of these connections, when the arm 4 is in the dotted position 6, it is engaging contacts 81, 82 and 83. It will be noted from Figs. 1 to 3 that contacts 14, 83 and 84 are connected by a suitable wire or conductor, while contacts 82, 85 and 86 are connected by an independent conductor. When the arm 4 is engaging contact 81 it is also engaging contacts 82 and 83. Current passing from this arm through contact 81 will also pass through wire 87 to contact 41, and through section 18 to contacts 76' and 76, and thence through wires 88 and 89 to the bright filaments of lamps 2 and 3. From the bright filaments of lamps 2 and 3 current will pass through the respective wires 71' and 65 to the ground, thus completing the circuit for the bright filaments. At the same time that current is passing through the circuit just described, current will also pass through contact 82 and through contact 85 and connecting wire to contact 86, whereupon it will flow through wire 90 to contact 43. From contact 43 the current will split and pass to contacts 79 and 80, and thence through the respective wires 91 and 75, and also wires 93 and 58, to the respective lamps 8 and 9. In addition, wire 46 will be energized, but as it is an open circuit no current will flow.

When the arm 4 is swung to the dotted position 7, the contacts 84, 85 and 95 will engage the arm and current will flow from contact 95, through wire 96, to contact 42. Current from this contact will energize the section 19, which in turn will transmit current to the contacts 77 and 78. From contact 78 current will pass through wire 97 and wire 71 to the dim filaments of lamp 2, and from thence through wire 71' to the ground. Likewise current will pass through wire 98' to contact 63 and wire 64 to the dim filaments of lamp 3, and thence through wire 65 to the ground. Current will also pass through contact 84 and thence to wire 46, but as this is an open circuit current will not flow.

In addition, current will flow to contact 85 through connecting wire and contact 86, and thence to wire 90 which energizes contact 43. From contact 43 current will flow as heretofore described to the lamps 8 and 9 at the rear.

In this way the dim filaments at the front will be lit as well as the tail lights. With the arm 4 engaging contact 81, however, the bright lights in the lamps 2 and 3 will be used as well as the tail lights 8 and 9.

When the arm 4 has been moved to the right as shown in Fig. 2, current will pass to wire 90, and thence to the rear or tail lights 8 and 9 as just described. In addition, current will flow to the contact 98, wire 99, wires 100 and 101, and through these two wires to the respective parking or cowl lights 10 and 11. From the cowl lights current will pass through the respective wires 104 and 105 to the return or ground wires 71' and 65. It will thus be seen that when the arm 4 is in the position shown in Fig. 2, and the arm 12 is in a central position, the cowl lights will be used and also the tail lights, but not the dim or bright filaments of the head lights 2 and 3.

It will be noted that regardless of whether the lights are turned off completely or whether they are connected to the high or bright side of the headlights, or whether they are connected to the lower or dim side of the headlights through the master switch, the signal switch picks up the current and changes it to the lower or dim filament, etc. In other words, if the master switch is turned off, or whether it is on the high or dim side of the headlights there is continuously flowing to the signal switch current which is ready for signal purposes upon the movement of the signal switch key to the right or left. The only time that this current is not connected with the signal switch is when the master switch key is turned to the right or to the parking lights. This is done purposely to prevent any signaling while the vehicle is in a parked position. For example, assume that the master switch key 4, Fig. 1, is turned 45° to the left, to the position indicated at 6, current is flowing from the battery wire 44 to contact point 45, through the switch key, to contact points 82 and 83. From point 83 current is carried to point 14, and on through wire 46 to contact point 47, on the signal switch. The circuit formed by wires and contact points 84, 83 and 14, wire 46 and contact point 47 is never broken.

I claim:—

1. A direction indicator for automobiles provided with a pair of head lights having bright and dim filaments, and a pair of rear lights, comprising a source of current, a circuit including said source of current, a switch, the bright filament of both of said head lights and the filaments of said rear lights, a second circuit including said source of current, said rear lights and the dim filaments of said head lights, a third circuit including said source of current and said rear lights, a fourth circuit including said source of current, a second switch, wiring extending from said second switch, a periodic circuit maker and breaker in said wiring and that part of said second circuit which connects the dim filament of the head light on the right hand side and the right hand side rear light, and a fifth circuit including said source of current, said second switch, wiring extending from said second switch and that part of said second circuit which connects the dim filament of the left hand light with the left hand rear light, whereby the lights of the automobile may be manipulated in the usual way, and in addition by moving said second switch in one direction, a dim filament on one side of the automobile and the rear light on the same side may be caused to flicker, and by moving said second switch in the opposite direction the dim filament on the opposite side of the automobile and the rear light on said opposite side may be caused to flicker while the other lights burn steadily.

2. A direction indicator for automotive vehicles having a pair of head lights with bright and dim filaments and a pair of tail lights, comprising a source of current, a primary circuit for said bright filaments including said tail lights and said source of current, a second circuit for said dim filaments including said tail lights and said source of current, a master switch interposed in both of said circuits for turning on and off either of said circuits, a signal switch and a periodic circuit maker and breaker arranged in series, a third circuit including said signal switch and said periodic circuit maker and breaker and that portion of said source of current including the connections to the primary circuit including the connections to the right-hand dim filament and the right-hand tail light, a fourth circuit including said signal switch, said periodic circuit maker and breaker and source of current and the connections to the left-hand dim filament and the left-hand tail light, whereby all of said lights may be turned on and off by said master switch and the tail lights and dim filaments may be flashed on either side of the vehicle.

3. A direction indicator for automotive vehicles having a pair of head lights with bright and dim filaments and a pair of tail lights, comprising a source of current, a primary circuit for said bright filaments and said tail lights including said source of power, a second circuit for said dim filaments and said tail lights including said source of current, a master switch interposed in both of said circuits for turning on or off either of said circuits, a signal switch and periodic circuit maker and breaker arranged in series adapted to be inserted in both of said circuits, said signal switch being formed with a plurality of contacts, and a swinging arm adapted to be moved to three different positions, namely, a neutral position, a position to engage certain of said contacts, and to engage other of said contacts, to provide secondary circuits so that when said arm is in one position said periodic circuit maker and breaker will cause a tail light and dim filament on the left side of the vehicle to flicker while the light on the right side will burn steadily, and in another position the tail light and the dim filament on the right side of the vehicle will flicker and the lights on the left side will burn steadily.

WALTER C. SULLENDER.